United States Patent [19]

Teramachi

[11] 4,444,443

[45] Apr. 24, 1984

[54] UNLIMITED SLIDING BALL BEARING SPLINE ASSEMBLY

[76] Inventor: Hiroshi Teramachi, 2-34-8, Higashi-Tamagawa, Setagaya-ku, Tokyo, Japan

[21] Appl. No.: 461,159

[22] Filed: Jan. 26, 1983

[30] Foreign Application Priority Data

Feb. 12, 1982 [JP] Japan .................... 57-20966

[51] Int. Cl.³ ............................................ F16C 29/06
[52] U.S. Cl. .................................................. 308/6 C
[58] Field of Search .............. 308/3 R, 3 A, 6 R, 6 A, 308/6 B, 6 C

[56] References Cited

U.S. PATENT DOCUMENTS

| 4,165,195 | 8/1979 | Teramachi | 308/6 C |
| 4,309,061 | 1/1982 | Teramachi | 308/6 C |
| 4,363,526 | 12/1982 | Teramachi | 308/6 C |
| 4,376,557 | 3/1983 | Teramachi | 308/6 C |
| 4,406,502 | 9/1983 | Teramachi | 308/6 C |

Primary Examiner—Stuart S. Levy
Assistant Examiner—David Werner
Attorney, Agent, or Firm—Armstrong, Nikaido, Marmelstein & Kubovcik

[57] ABSTRACT

An unlimited sliding ball bearing spline assembly comprises an outer sleeve, a pair of cage halves and a spline shaft. The outer sleeve has a pair of outer peripheral grooves for guiding no-load carrying balls and a pair of inner peripheral grooves for guiding load carrying balls formed longitudinally in outer and inner walls of the outer sleeve, respectively, and alternated with one another in the circumferential direction of the outer sleeve. The grooves of each pair are symmetrically disposed in diametrical opposition to each other. Each of the inner and outer peripheral grooves being provided with semi-circular ball rolling surfaces at both longitudinal sides, respectively. Each of the cage halves includes outer guide members each of which has an inwardly projecting partition wall at a position corresponding to the longitudinal center line of the associated outer peripheral groove, grooves for guiding the no-load carrying balls formed at both sides of each of the partition walls, respectively, each of the grooves cooperating with the adjacent one of the ball rolling surfaces formed in each of the outer peripheral grooves, and inner guide members provided with grooves for guiding the load carrying balls in cooperation with the ball rolling surfaces formed in the inner peripheral grooves of the outer sleeve, respectively. Each of the load carrying ball guiding grooves has a longitudinal slit.

4 Claims, 7 Drawing Figures

UNLIMITED SLIDING BALL BEARING SPLINE ASSEMBLY

BACKGROUND OF THE INVENTION

The present invention relates in general to an unlimited sliding ball bearing spline assembly which includes a ball bearing and a spline shaft slideably supported by the ball bearing and which allows linear relative motion between the ball bearing and the spline shaft singly or in combination with transmission of torque from the spline shaft to the ball bearing or vice versa.

The ball bearing spline assembly which the present invention concerns enjoys wide application on spindles of various machine tools, columns and arms of industrial robots, auto-loaders, spindles for spot welding machines, guide shafts for various high-speed automatic machines and others.

The unlimited sliding ball bearing spline assemblies of the type mentioned above have heretofore been known. In general, the ball bearing of the ball bearing spline assembly is composed of an outer sleeve and a cage for holding therebetween a large number of balls grouped into a plurality of sets in each of which balls are guided as load carrying and no-load carrying balls along an elongated loop-like raceway formed in substantially U-like grooves. These grooves are formed in the wall and an inner peripheral surface of a cylindrical outer sleeve of a steel material, which involves complicated and expensive machine processings. For example, preparation of the outer sleeve requires a turning work, while formation of the various longitudinal grooves requires a broaching work. A relatively large number of steps for these machine processings of different types provides a major cause for increasing the costs of the finished products.

Further, the cage which is fitted within the outer sleeve is usually formed by pressing working and composed of a plurality of segments longitudinally extending and uniformly distributed in the circumferential direction of the outer sleeve and requires much complicated and troublesome procedures upon assembling, giving rise to a possibility that the smooth relative displacement between the spline shaft and the ball bearing could not be attained due to errors possibly involved in the assembling.

Besides, since a rolling direction changing groove for transferring the balls from the load-carrying ball zone to the no-load carrying ball zone or vice versa is located at a joint portion between the outer sleeve and/or the cage and an end cover plate, even a slight offset produced at the joint portion provides resistance to the smooth rolling of the balls and/or a cause for generation of noise.

Besides, because of such an arrangement that a line passing the axial center of the outer sleeve and the center of the load carrying ball intersects at an obtuse angle a line which passes the load carrying ball and the no-load carrying ball, a considerably great radial distance is produced between the axial center of the outer sleeve and the center of the no-load carrying ball, thereby giving rise to a problem that the circulatory movement of the balls encounters difficulty under the influence of a centrifugal force to which the balls are subjected upon rotation of the ball bearing spline assembly.

SUMMARY OF THE INVENTION

An object of the present invention is to provide an unlimited sliding ball bearing spline assembly which is substantially immune to the drawbacks described above.

Another object of the present invention is to provide a ball bearing spline assembly which can be manufactured and assembled in a much simplified manner without requiring machine working or processing for forming the ball guide grooves in the outer sleeve.

Still another object of the present invention is to provide a ball bearing spline assembly in which end plates are integrally formed with a ball holding cage.

A further object of the present invention is to provide a ball bearing spline assembly in which the balls can roll smoothly along the closed loop-like raceway tracks without generating noise even in ball rolling direction changing zones.

A still further object of the present invention is to provide a ball bearing spline assembly in which a smooth circulative movement of the aligned balls can be assured by establishing an appropriate positional or geometrical relationship between the load carrying balls and the no-load carrying balls.

In view of the above and other objects which will become more apparent as description proceeds, there is provided according to a general aspect of the present invention a ball bearing spline assembly comprising, a cylindrical outer sleeve means having a pair of outer peripheral grooves for guiding no-load carrying balls and a pair of inner peripheral grooves for guiding load carrying balls formed longitudinally in outer and inner walls of the outer sleeve, respectively, so that the outer peripheral grooves and the inner peripheral grooves are alternated with each other in the circumferential direction of the outer sleeve, the outer peripheral grooves being symmetrically disposed in diametrical opposition to each other, the inner peripheral grooves also being symmetrically disposed in diametrical opposition to each other, wherein first ball rolling surfaces are formed at both longitudinal sides of each of the inner peripheral grooves, each of the first ball rolling surfaces having a center of curvature lying on a first line which is inclined at an angle of ca. 45° relative to a second line which passes the longitudinal center line of each of the outer peripheral grooves and the axial center of the outer sleeve, while second ball rolling surfaces are formed at both longitudinal sides of each of the outer peripheral grooves, each of the second ball rolling surfaces having a center of curvature lying on a third line which intersects the first line at an angle of ca. 90° and extending toward the second line; a pair of cage halves means including outer guide members, each of which has an inwardly projecting partition wall at a position corresponding to the second line, grooves for guiding the no-load carrying balls formed at both sides of each of the partition walls, respectively, each of the grooves cooperating with the adjacent one of the ball rolling surfaces formed in each of the outer peripheral grooves, and inner guide members provided with grooves for guiding the load carrying balls in cooperation with the first ball rolling surfaces formed in the inner peripheral grooves of the outer sleeve, respectively, each of the load carrying ball guiding grooves having a longitudinal slit, the outer and inner guide members projecting longitudinally from a base portion of the cage half with a predetermined space therebetween, the pair of cage halves being connected together in an end abutting relation to constitute a cage unit; and a spline shaft means slideably inserted in a bore defined by the inner guide members and having a plurality of longitudinal protrusions adapted to be received, respectively, in a corresponding number of recesses defined by rows of balls accommodated within the ball guiding grooves and held between the outer sleeve and the cage unit.

The above and other objects, novel features and advantages of the present invention will be more readily understood from the following description of preferred embodiments thereof. The description makes reference to the accompanying drawings.

DETAILED DESCRIPTION OF THE PREFERRED EMBODIMENTS

Now, the invention will be described in conjunction with an exemplary embodiment thereof by referring to the accompanying drawings.

Figure 1:
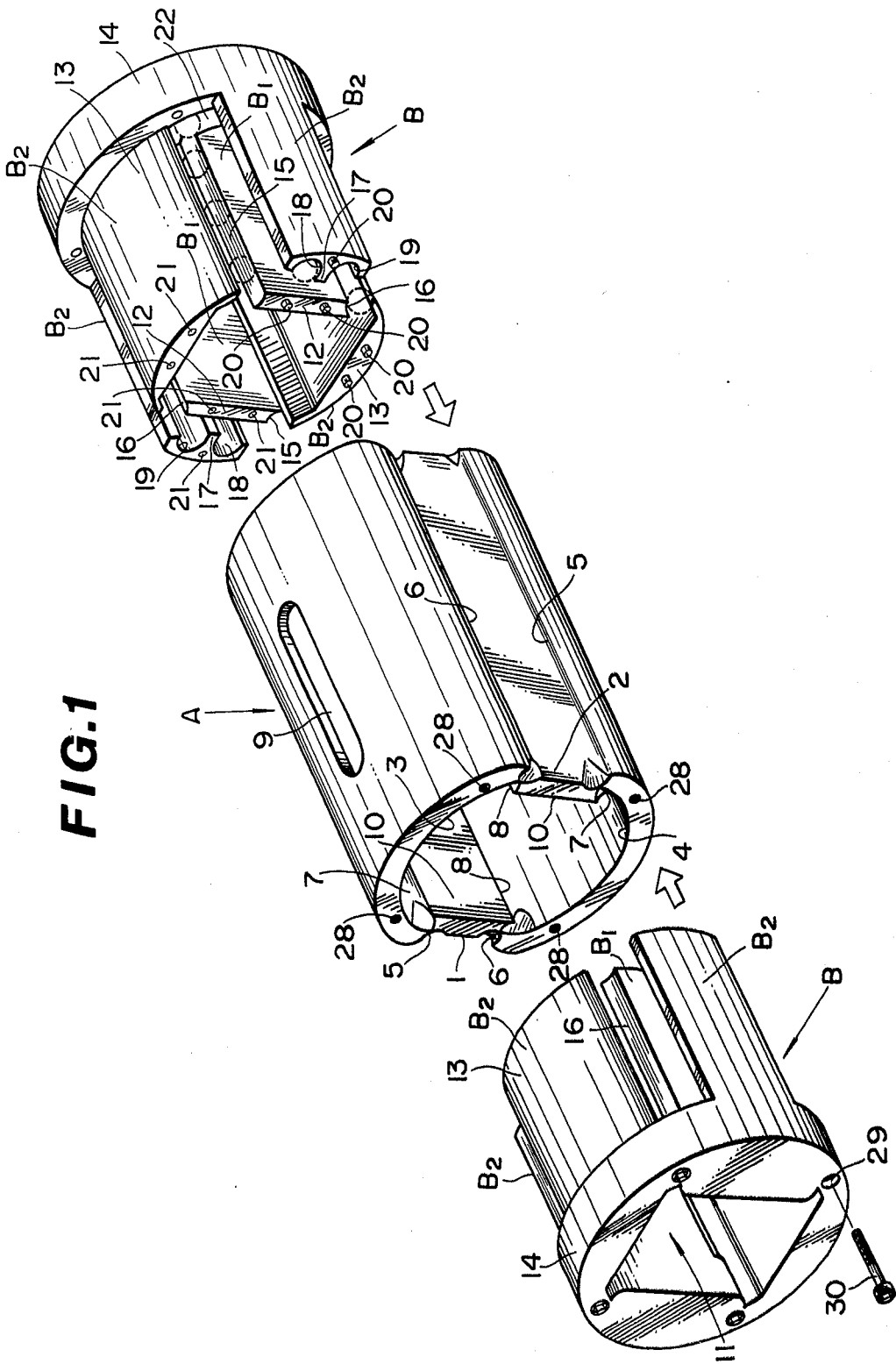
FIG. 1 is an exploded perspective view showing an outer sleeve and a pair of cage halves constituting an unlimited sliding ball bearing for a spline according to a first embodiment of the invention.

Referring to FIGS. 1 to 6 and particularly to FIG. 1, an unlimited sliding ball bearing spline assembly according to an embodiment of the invention is essentially composed of a sleeve generally denoted by a reference letter A, a pair of cage halves B having an identical structure and adapted to be connected together in an end abutting relation to thereby constitute a cage or holder generally denoted by B, plural sets of balls C (not shown in FIG. 1) adapted to roll in respective endless track grooves defined between the outer sleeve A and the cage or holder B as described hereinafter, and a spline shaft 24 (not shown in FIG. 1). The outer sleeve A made of a quenchable steel material through shaping press or draw working in a uniform wall thickness have outer peripheral grooves 1 and 2 and inner peripheral grooves 3 and 4 each of substantially U-like cross-section. The outer peripheral grooves 1 and 2 and the inner peripheral grooves 3 and 4 are formed in the outer and the inner surfaces of the sleeve A alternately with each other as viewed in the circumferential direction thereof. The outer peripheral grooves 1 and 2 are symmetrically disposed in diametrical opposition to each other so that both the grooves are bisected by a horizontal line X which passes the center axis O of the outer sleeve A, while the inner peripheral grooves 3 and 4 are also symmetrically disposed in diametrical opposition to each other so as to be bisected by a vertical line Y which extends through the center axis O perpendicularly to the line X, as will be clearly seen in FIG. 2. The outer and inner peripheral grooves 1, 2, 3 and 4 extend in the longitudinal direction of the outer sleeve A in parallel to one another. Each of the outer peripheral grooves 1 and 2 is adapted to guide the no-load carrying balls $C_1$, while the inner peripheral grooves 3 and 4 are adapted to guide the load carrying balls $C_2$ serving for torque transmission, as will hereinafter be described in detail. To this end, each of the outer peripheral grooves 1 and 2 is provided with ball rolling surfaces 5 and 6 at both sides thereof, each of the rolling surfaces having a curvature approximately equal to that of the ball C. In the similar manner, each of the inner peripheral grooves 3 and 4 is provided with ball rolling surfaces 7 and 8 each having the curvature substantially corresponding to that of the ball C.

Figure 2:
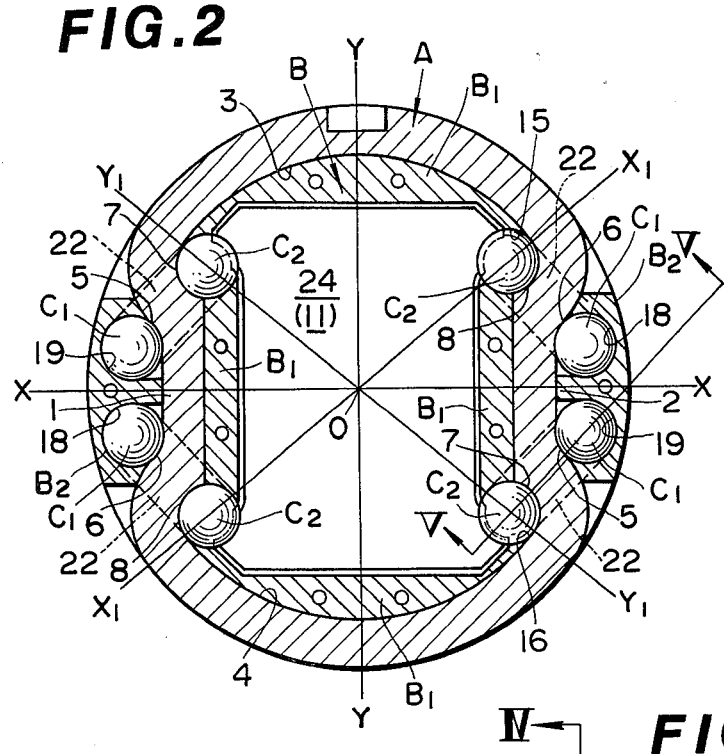
FIG. 2 is a cross-sectional view taken at a mid portion of the ball bearing spline assembly in the assembled state.
Figure 5:
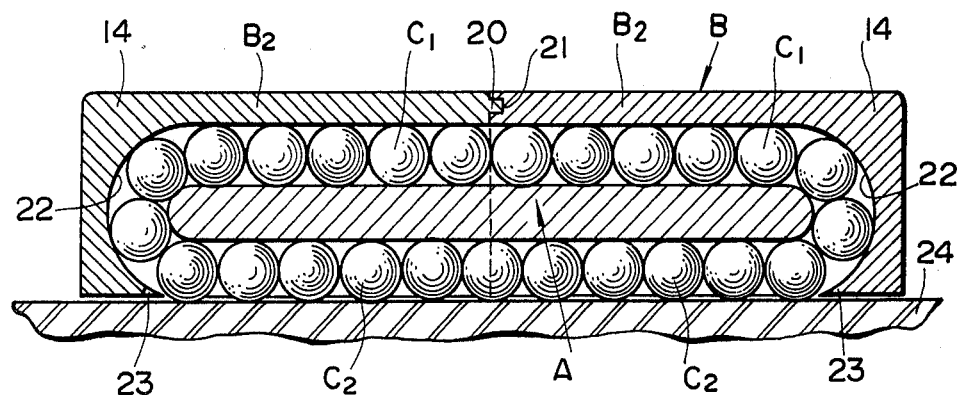
FIG. 5 is a sectional view taken along line V—V in FIG. 2.
Figure 6:
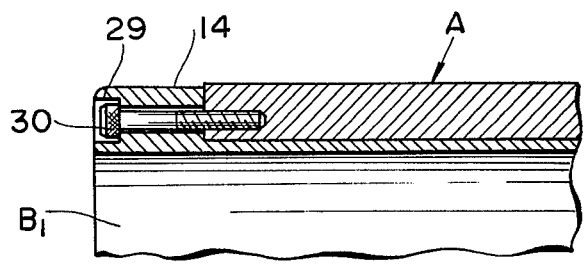
FIG. 6 is a sectional view taken along line VI—VI in FIG. 3 for illustrating a connection of the outer sleeve and the cage halves.

Describing a position or geometrical relationship between the ball rolling surfaces 5 and 6 formed in each of the outer peripheral grooves 1 and 2 and the ball rolling surfaces 7 and 8 formed in each of the inner peripheral grooves 3 and 4 by taking as examples the righthand side outer peripheral grooves 2 bisected by the horizontal line X and the adjacent inner peripheral grooves 3 and 4, it is important to note that the righthand side ball rolling surface 5 of the outer peripheral groove 2 as viewed in FIG. 2 cooperates with the righthand side ball rolling surface 7 of the inner peripheral groove 4 to constitute a closed loop rolling track along which a set of balls C are recirculated, while the upper side ball rolling surface 6 of the outer peripheral groove 2 as viewed in FIG. 2 is combined with the upper side ball rolling surface 8 of the inner peripheral groove 3 to define another closed loop rolling track along which another set of the balls C are recirculated in a manner illustrated in FIG. 5.

Figure 3:
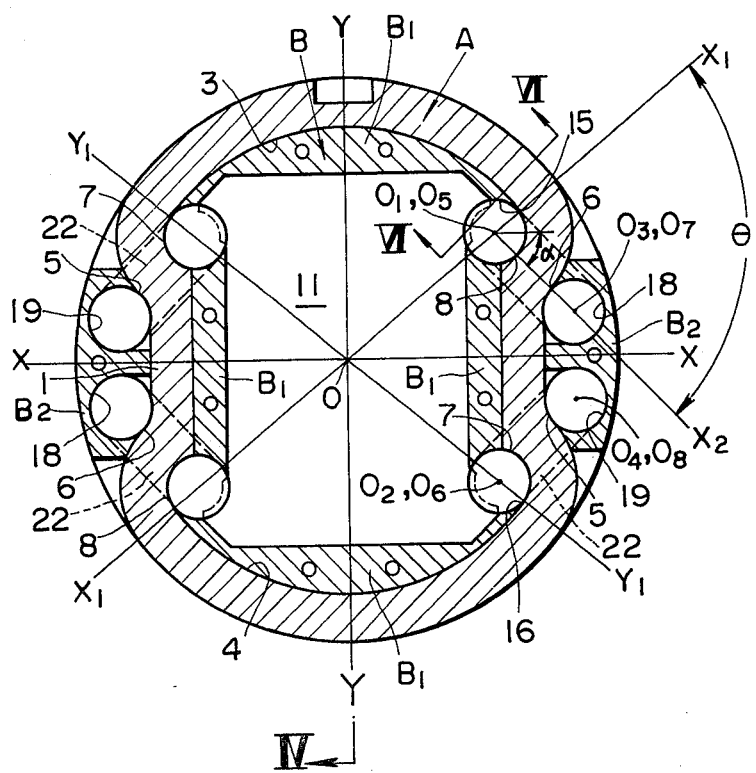
FIG. 3 is a view similar to FIG. 2 and illustrates positional or geometrical relationships among load carrying balls, no-load carrying balls and ball rolling surfaces with the spline being removed.

Referring to FIG. 3, it should further be noted that the centers of curvature $O_1$ and $O_2$ of the ball rolling surfaces 7 and 8 of the inner peripheral grooves 3 and 4, respectively, are located on inclined lines $X_1$ and $Y_1$, respectively, wherein the line $X_1$ corresponds to the counterclockwise rotation of the horizontal line X for about 45°, while the line $Y_1$ corresponds to the counterclockwise rotation of the vertical line Y for about 45°, the vertical line Y extending through the center O of the outer sleeve A perpendicularly to the horizontal line X. These centers of curvature $O_1$ and $O_2$ of the ball rolling surfaces 7 and 8 coincide with the centers of circle $O_5$ and $O_6$ of load carrying ball grooves 15 and 16, respectively, of the cage B described hereinafter. On the other hand, the center of curvature $O_3$ of the ball rolling surface 6 formed in the outer peripheral groove (1; 2) is located on a line $X_2$ which passes the center of curvature $O_1$ of the ball rolling surface 8 and intersectes the line $X'$ at an angle $\theta$ which is substantially equal to 90°. The same applies to the center of curvature $O_4$ of the ball rolling surface 5. These center of curvature $O_3$ and $O_4$ coincide with the centers of circles $O_7$ and $O_8$ of no-load carrying ball grooves 18 and 19 of the cage B, respectively.

By virtue of such geometrical arrangement that the line $X_2$ which passes both the center of the load carrying ball $C_2$ and the center of the adjacent no-load carrying ball $C_1$ intersects the inclined line $X_1$ at the angle $\theta$ of about 90°, the inclined line $X_1$ passing the center axis O of the outer sleeve A and the center of the load carrying balls $C_2$, the difference between the radial distance from the center axis O of the outer sleeve A to the center of the load carrying ball and the radial distance from that center axis O to the center of the no-load carrying ball can be significantly reduced to about a half of the ball radius, whereby the load carrying ball and the no-load carrying ball can be positioned very close to each other. Further, the load carrying ball $C_2$ rolling in the groove of the cage B contacts the ball rolling surface of the inner peripheral groove over a contact angle α of about 45°. When a load is applied, the area over which the surface of the load carrying ball $C_2$ is in contact with the ball rolling surface is increased due to elastic deformation, as the result of which the load to be borne by a unit area of the ball rolling surface is correspondingly reduced, which in turn means that torque to be transmitted can be correspondingly increased.

Referring again to FIG. 1, a reference numeral 9 denotes a key recess formed in the outer sleeve A for mounting or connecting the ball bearing spline assembly to other structure.

Each of the holder or cage halves B serving in combination for guiding the rolling of the load carrying balls $C_2$ and the no-load carrying balls $C_1$ is integrally formed by a die-cast forming, resin moulding or precision casting. The cage halves are adapted to be snugly fitted in the outer sleeve A from both ends thereof in close contact with the inner and outer peripheral surfaces of the sleeve A to be connected together at a mid portion in an end abutting relation. To this end, each of the cage halves B includes an inner guide member $B_1$ of a substantially elliptical cross-sectional profile adapted to be brought into intimate contact with the inner peripheral surfaces of the outer sleeve A and outer guide members $B_2$ each having a substantially T-like cross-section and adapted to be snugly engaged with the bottom surfaces of the outer peripheral grooves 1 and 2, respectively, of the outer sleeve A. The inner and the outer guide members $B_1$ and $B_2$ extend from a circular base portion 14 in the longitudinal direction of the cage half B in the integral structure. The inner guide member $B_1$ includes a pair of substantially rectangular flat elements 12 horizontally symmetically disposed in diametrical opposition to each other and adapted to be snugly and coincidently fitted onto inner flat surfaces 10, respectively, each of which extends between the inner peripheral grooves 3 and 4 of the outer sleeve A, and a pair of arcuate elements 13 of an arcuate cross-section disposed vertically symmetrically in diametrical opposition to each other and each having an arcuate outer peripheral surface whose center of curvature coincides with the axial center O. The arcuate outer peripheral surfaces of the arcuate elements 13 are thus brought into snug and coincident contact with the inner peripheral grooves 3 and 4 of the outer sleeve A upon assembling. The flat elements 12 as well as the arcuate elements 13 extend longitudinally from the circular base portion 14 in the integral structure. The inner surfaces of the flat elements 12 facing each other cooperate with the inner surfaces of the arcuate elements 13 to define a substantially rectangular space or bore 11 in which the spline shaft 24 is slideably inserted. The load carrying ball grooves 15 and 16 are formed at boundary portions between the flat elements 12 and the arcuate members 13, respectively. Each of the grooves 15 and 16 is imparted with radius of curvature substantially equal to that of the ball C and provided with a longitudinal slit of a width smaller than the diameter of the ball C so that the load carrying ball $C_2$ is prevented from falling out from the grooves 15 and 16 (refer to FIG. 2). As described hereinbefore, the centers of curvature $O_5$ and $O_6$ of the load carrying ball grooves 15 and 16 coincide with the centers of curvature $O_1$ and $O_2$ of the ball rolling surfaces 7 and 8 formed in the inner peripheral grooves 3 and 4, respectively, of the outer sleeve A.

On the other hand, each of the outer guide members $B_2$ having the substantially T-like cross-section has a depending partition wall 17 integrally formed along a longitudinal center line of the outer guide member, the partition wall 17 being separated from the flat plate element 12 mentioned above at a distance substantially equal to the wall thickness of the outer sleeve A. Thus, when the outer sleeve A and the cage halves B are assembled, the depending partition walls 17 are located, respectively, on the longitudinal center lines of the outer peripheral grooves 1 and 2 and thus on the horizontal line X which passes the axial center O of the outer sleeve. There are formed on both sides of each of the partition walls 17 at a base portion thereof grooves 18 and 19 of semicircular cross-section which define the rolling tracks for the no-load carrying balls $C_1$ in cooperation with the ball rolling surfaces 5 and 6, respectively, which are provided in the outer sleeve A. Needless to say, the inner surfaces of the grooves 18 and 19 are imparted with a curvature of the radius substantially equal to that of the ball C. The centers of curvature $O_7$ and $O_8$ of the no-load carrying ball grooves 18 and 19 coincide with those $O_3$ and $O_4$ of the ball rolling surfaces 5 and 6 formed in the outer periphery of the sleeve A.

As described hereinbefore, the pair of the cage or holder halves B;B each of the identical structure are fitted in the outer sleeve A from both both ends thereof in the end abutting manner to be connected together at the mid portion of the outer sleeve A. To this end, there are formed positioning or engaging projection 20 and guide holes 21 alternately at the opposing ends of the inner guide members $B_1$ and the outer guide members $B_2$ of the cage halves B, so that the projections 20 provided in one of the cage halves B may engage in the holes 21 of the other cage half. Referring to FIG. 5, there is formed in the inner wall of the cylindrical base portion 14 of each cage half B ball rolling direction changing grooves 22 for communicating the load carrying ball grooves 15 and 16 to the no-load carrying ball grooves 18 and 19, respectively, to thereby allow the rolling direction of the balls to be changed from the zone of the load carrying balls $C_2$ toward the zone of the no-load carrying balls $C_1$ or vice versa. Reference numerals 22 and 23 denote tongues formed in the ball rolling direction changing groove 30 at the side of the load carrying ball zone for scooping up the load carrying balls $C_2$ which are to be transferred to the zone of the no-load carrying balls $C_1$.

Figure 4:
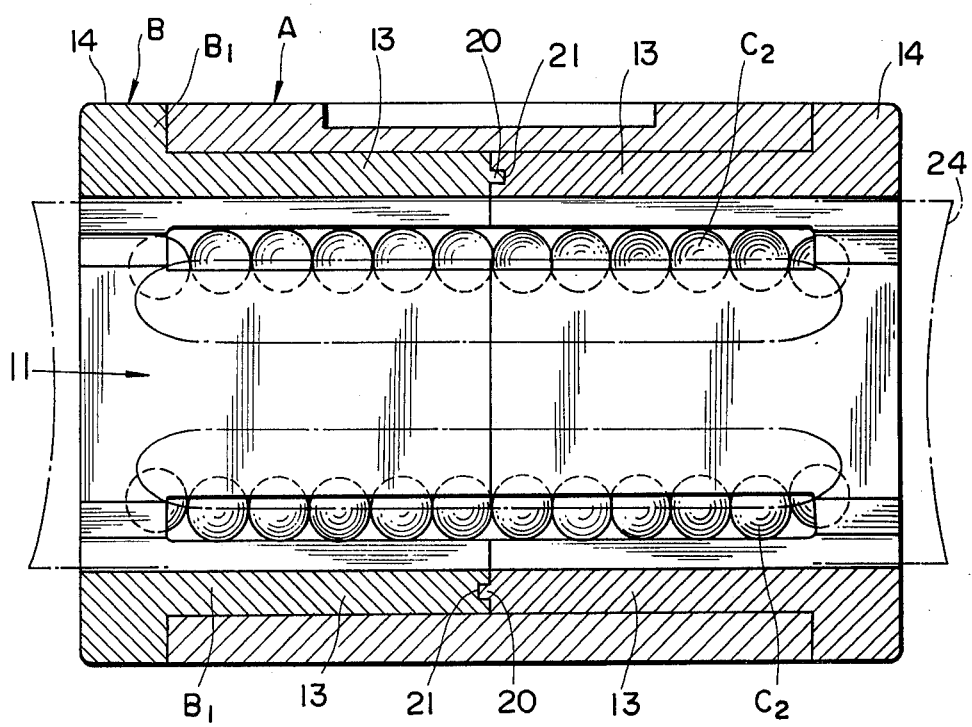
FIG. 4 is a sectional view taken along line III—III in FIG. 3 and illustrates circulative movement of balls in aligned state.
Figure 7:
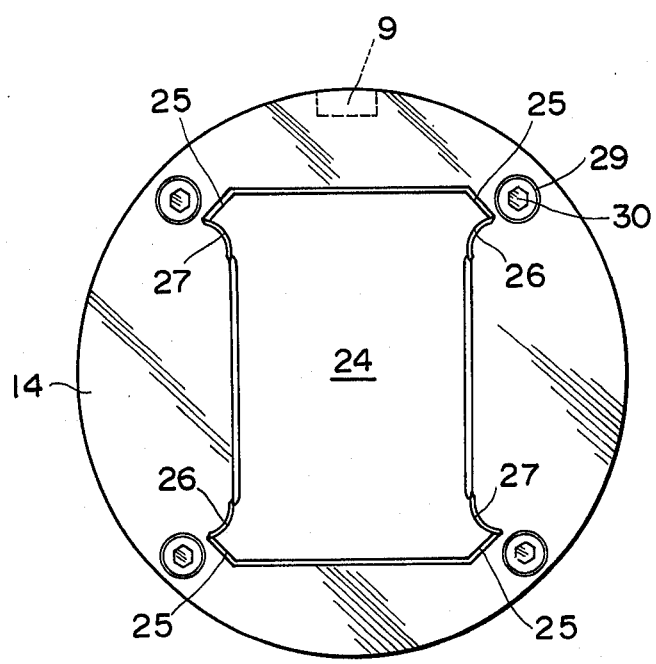
FIG. 7 is an end-elevational view showing the unlimited sliding ball bearing spline assembly according to the invention in the assembled state.

Referring to FIGS. 2, 4 and 7 in particular, there is slideably inserted in the bore 11 defined by the inner guide member $B_1$ of the cage the spline shaft 24 which has a rectangular cross-section substantially coinciding with that of the inner bore 11. The spline shaft 24 has at least a length which permits all the longitudinal rows of the load carrying balls $C_2$ to be rolled and is provided with ridge portions 25 each at a corner of the spline shaft 24. As can be seen in FIGS. 2 and 7, there are formed at opposite side walls of the ridge portions 25 ball rolling surfaces 26 and 27 each having a radius of curvature substantially equal to the radius of the ball C. The angle of contact between these ball rolling surfaces and the loading carrying ball $C_2$ is also selected on the order of 45°.

After the pair of the cage halves B;B having been fitted in the sleeve A from both ends thereof in opposition to each other, screw bolts 30 are threaded into threaded bores 28, respectively, through screw holes 29 formed in the end walls of the cage halves B. By tightening the screw bolts, an unlimited sliding ball bearing spline assembly according to the present invention is obtained in an unit structure. In case the cage halves are formed of a synthetic resin, the mid connection of the cage may be realized with the aid of a plastic welding technique, although not shown.

In the unlimited sliding ball bearing spline assembly of the structure disclosed in the foregoing, when the spline shaft 24 is moved in the longitudinal direction while being rotated in one direction, the balls C located within the cage B, i.e. the load carrying balls $C_2$ for torque transmission project partially through the slits formed in the aforementioned load carrying ball grooves 15 and 16, respectively, to be put in rolling contact with the ball rolling surfaces 26 and 27 formed in each ridge portions of the spline shaft 24 and the ball rolling surfaces 7 and 8 of the sleeve A. When the load carrying balls $C_2$ are scooped by the tongues 23 projecting into the load carrying ball grooves 15 and 16 to be turned in the rolling direction from the linear to the circular path, the load carrying balls $C_2$ move with rolling on the ball rolling direction changing grooves 22 formed in the cylindrical base portions 14 of the cage to be transferred to the no-load carrying ball grooves 18 and 19 of the cage B, where the balls $C_2$ get rid of load. In this manner, the balls C are caused to move along the load carrying ball grooves 15 and 16 and the no-load carrying ball grooves 18 and 19, respectively, in a closed loop, whereby the same ball C functions as the load carrying ball $C_2$ and the no-load carrying ball $C_1$.

With the structure of the unlimited sliding ball bearing spline assembly according to the invention described in the foregoing, the ball rolling surfaces of the inner and outer peripheral grooves of the outer sleeve can be advantageously formed integrally with the outer sleeve through press shaping without requiring formation of the U-like guide grooves by broaching as is the case of the prior art. Further, since the guide grooves for the no-load carrying balls can be realized by the combinations of the outer peripheral grooves of the outer sleeve and the outer guide members of the cage, there is required no broaching process, involving reduction in the manufacturing costs.

Further, because of the contact angle of ca. 45° between the load carrying ball and the ball rolling surface, the ball bearing spline assembly is capable of transmitting increased torque, while an increased load withstanding capability is assured for the radial load.

By virtue of the small difference in radial distance between the axial center of the outer sleeve and that of the load carrying balls on one hand and that of the no-load carrying balls on the other hand, the outer diameter of the outer sleeve can be reduced to thereby permit the bearing assembly of a compact design and a small size to be realized with expenditure for material being correspondingly reduced. Besides, due to the feature mentioned above, the influence of a centrifugal force produced upon rotation at a high speed can be suppressed to minimum, whereby circulation of the balls can be effected smoothly without encountering any appreciable sliding resistance. Additionally, the arrangement in which the row of the load carrying balls is confined between the ball rolling surface of the outer sleeve and that of the spline shaft in a manner sandwiched therebetween allows a pre-load to be applied in a rotating direction, whereby the rigidity as well as the use life of the ball bearing spline shaft assembly can be significantly increased, to further advantages.

The invention has been described in conjunction with the exemplary embodiments shown in the accompanying drawings. It should however be noted that modifications and variations of the disclosed structure may readily occur to those skilled in the art without departing from the spirit and scope of the invention.

What is claimed is:

1. A ball bearing spline assembly comprising:
    a cylindrical outer sleeve means having a pair of outer peripheral grooves for guiding no-load carrying balls and a pair of inner peripheral grooves for guiding load carrying balls formed longitudinally in outer and inner walls of said outer sleeve, respectively, so that said outer peripheral grooves and said inner peripheral grooves are alternated with each other in the circumferential direction of said outer sleeve, said outer peripheral grooves being symmetrically disposed in diametrical opposition to each other, said inner peripheral grooves also being symmetrically disposed in diametrical opposition to each other, wherein first ball rolling surfaces are formed at both longitudinal sides of each of said inner peripheral grooves, each of said first ball rolling surfaces having a center of curvature lying on a first line which is inclined at an angle of ca. 45° relative to a second line which passes the longitudinal center line of each of said outer peripheral grooves and said axial center of said outer sleeve, while second ball rolling surfaces are formed at both longitudinal sides of each of said outer peripheral grooves, each of said second ball rolling surfaces having a center of curvature lying on a third line which intersects said first line at an angle of ca. 90° and extending toward said second line;
    a pair of cage half means including outer guide members, each of which has an inwardly projecting partition wall at a position corresponding to said second line grooves for guiding the no-load carrying balls formed at both sides of each of said partition walls, respectively, each of said grooves cooperating with the adjacent one of said ball rolling surfaces formed in each of said outer peripheral grooves, and inner guide members provided with grooves for guiding the load carrying balls in cooperation with said first ball rolling surfaces formed in said inner peripheral grooves of said outer sleeve, respectively, each of said load carrying ball guiding grooves having a longitudinal slit, said outer and inner guide members projecting longitudinally from a base portion of said cage half with a predetermined space therebetween, said pair of cage halves being connected together in an end abutting relation to constitute a cage unit; and
    a spline shaft means slideably inserted in a bore defined by said inner guide members and having a plurality of longitudinal protrusions adapted to be received, respectively, in a corresponding number of recesses defined by rows of balls accommodated within said ball guiding grooves and held between said outer sleeve and said cage unit.

2. A ball bearing spline assembly according to claim 1, wherein angle of contact between said ball and the ball rolling surfaces of said outer sleeve and said spline shaft is on the order of 45°.

3. A ball bearing spline assembly according to claim 1, wherein each of said outer peripheral grooves for guiding the no-load carrying balls is communicated to the adjacent inner peripheral groove for guiding the load carrying balls through a rolling direction changing groove formed in said base portion of each of said cage halves.

4. A ball bearing spline assembly according to claim 3, wherein a ball scooping means for allowing smooth transfer of the balls between the groove for guiding the load carrying balls and the groove for guiding the no-load carrying ball is disposed at an end of each of said slits.

* * * * *